Oct. 2, 1928.

V. C. E. LE GLOAHEC

MANUFACTURE OF CARPETS

Filed Dec. 19, 1924     6 Sheets-Sheet 1

Victor Charles Emile Le Gloahec,
Inventor
By Mock & Blum
Attorneys

V. C. E. LE GLOAHEC 1,686,331

MANUFACTURE OF CARPETS

Filed Dec. 19, 1924    6 Sheets-Sheet 4

Victor Charles Emile Le Gloahec, Inventor
By Mark Blum, Attorneys

Oct. 2, 1928.  1,686,331
V. C. E. LE GLOAHEC
MANUFACTURE OF CARPETS
Filed Dec. 19, 1924  6 Sheets-Sheet 5

Oct. 2, 1928.

V. C. E. LE GLOAHEC 1,686,331

MANUFACTURE OF CARPETS

Filed Dec. 19, 1924      6 Sheets-Sheet 6

Victor Charles Emile Le Gloahec,
Inventor
By Mock & Blum
Attorneys

Patented Oct. 2, 1928.

1,686,331

UNITED STATES PATENT OFFICE.

VICTOR CHARLES EMILE LE GLOAHEC, OF ST. CLOUD, FRANCE.

MANUFACTURE OF CARPETS.

Application filed December 19, 1924, Serial No. 756,864, and in Belgium December 20, 1923.

This invention relates to the manufacture of carpets and like fabrics, and has for its principal object to enable such fabrics to be manufactured by automatic machinery of an improved type.

According to the general principle of the invention, in the manufacture of fabrics of the class in question, thread carrying needles or shuttles are provided which are adapted to be given an alternating movement of translation from one side to the other of the warp and in a direction perpendicular to the plane of the warp, in combination with means for giving the needles a transverse motion parallel to the warp. If desired, mechanism is provided for giving some of the threads carried by said needles a transverse motion with respect to the others so as to produce mechanically as many points or stitch patterns on the material as there are needles moved which points have usually to be made one at a time by hand.

In order that the invention may be clearly understood, a preferred embodiment will be described in the accompanying drawings.

The drawings illustrate, as already stated, a preferred construction of the loom for the manufacture of carpets, and tapestries, and the construction is substantially as follows.

Figure 1:
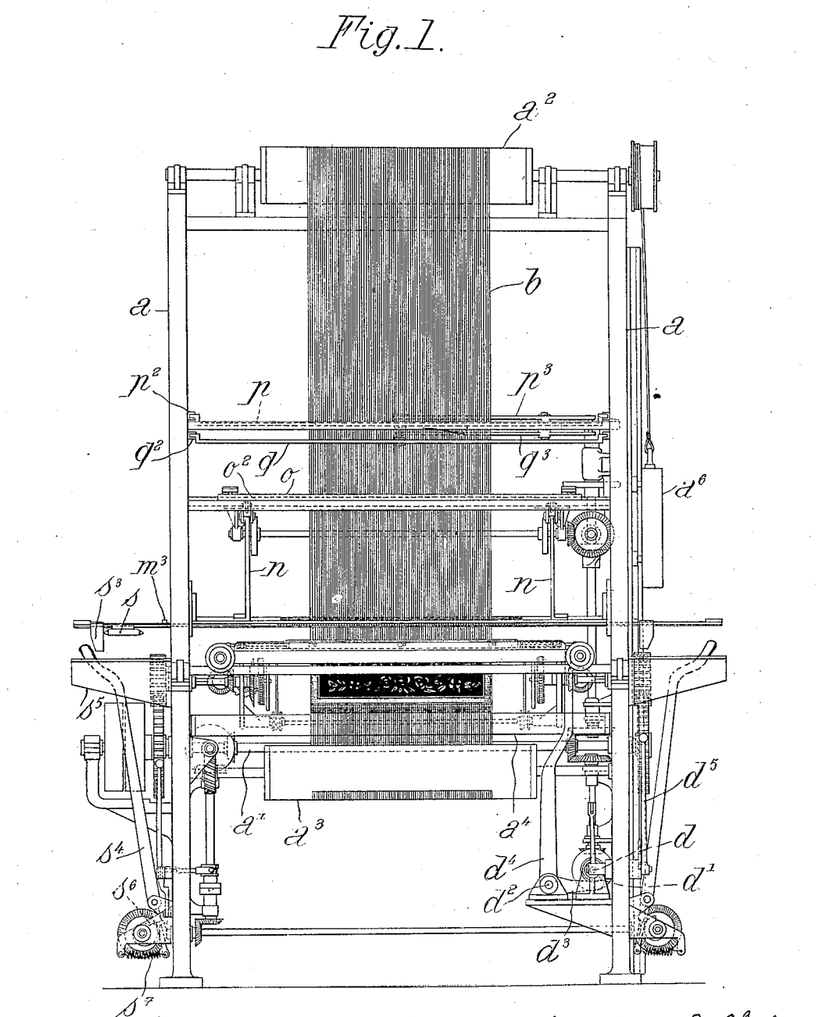
Figs. 1 and 2 show respectively in front elevation and in side elevation a loom for carpets and tapestry constructed according to the invention.
Figure 2:
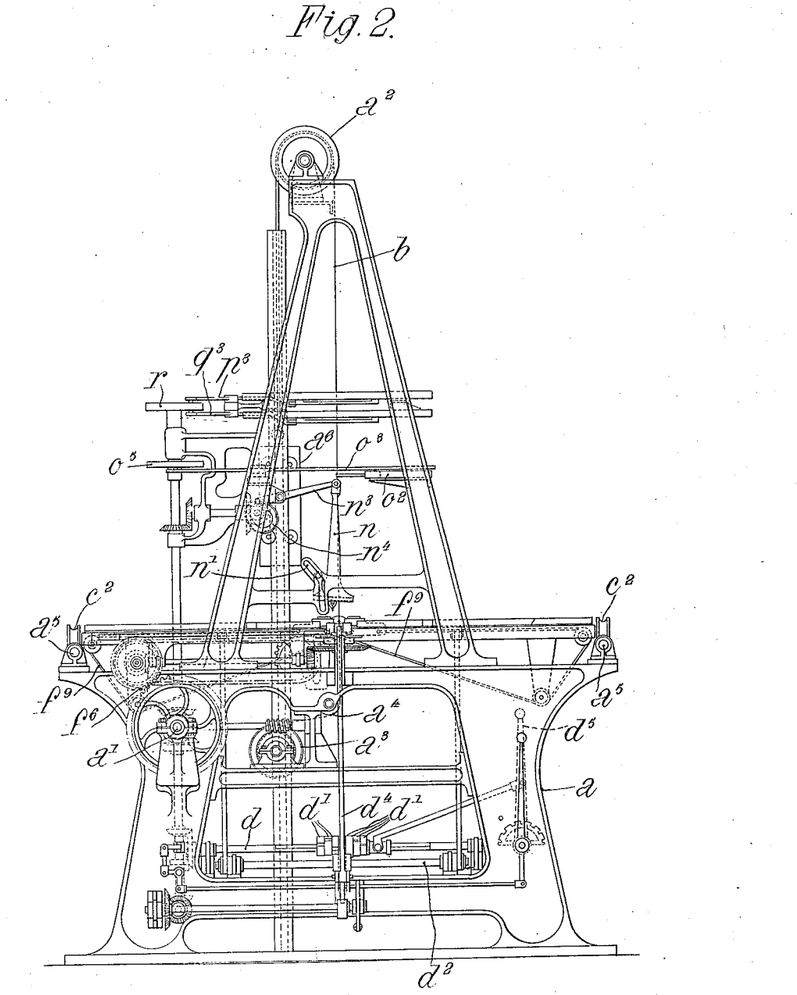

$a$ is a framework carrying a driving shaft $a^1$, operated, for instance, by means of a transmission belt. The framework supports two horizontal rollers $a^2$ and $a^3$, which serve respectively for reeling off the warp threads $b$ and for rolling up the carpet. As shown in Fig. 2, the warp or warp threads may pass around an idler $a^4$ which maintains said threads under tension. The warp threads $b$ extend vertically, and the roller $a^3$ on to which the fabric is rolled is revolved at relatively low speed by the shaft $a^1$, by means of suitable connecting gears. Tension on the warp threads is obtained by a counterpoise weight $a^6$.

$a^5$ are two horizontal rails located parallel to the plane of the threads $b$.

$c$ is a carriage having a frame through which the warp $b$ passes. It is provided with two parallel side members $c^1$ which may be made, for instance, of angle iron. It is provided with rollers $c^2$ adapted to roll on the rails $a^5$, and the sides $c^1$ are perpendicular to those rails.

Means are provided for moving the carriage $c$ to and fro in a definite path on the rails $a^5$.

These means comprise a shaft $d$ carrying a cam, or preferably a plurality of cams $d^1$ revoluble with said shaft and slidably mounted on said shaft by means of long keys and feather ways. The said shaft $d$ is perpendicular to the warp $b$ and is operated by the shaft $a^1$ through suitable intermediate gears. $d^2$ is a shaft parallel to the last mentioned shaft. $d^3$ is an arm mounted on the shaft $d^2$, and adapted to be operated by the particular cam $d^1$ moved adjacent thereto. There are also one or more arms $d^4$ mounted on the said shaft $d^2$, each said arm $d^4$ having a fork at an elongated opening a its end cooperating with a roller carried by the carriage $c$. $d^5$ is a lever connected to the cams $d^1$ and adapted to slide them on the shaft $d$ so as to bring opposite to the arm $d^3$ the cam which will cause the desired reciprocatory movement of carriage $c$ in a direction parallel to the plane of the warp threads.

$e$ are two members, each having a U-shaped cross-section, and having the vertical branches of the U shorter than the horizontal branch. The length of each member $e$ is equal to the breadth of the carriage $c$. When the thread carrier supports $e$ are placed in position, one at each side of the warp $b$, they can be moved in a direction perpendicularly to the plane of the warp. The ends of thread carrier supports $e$ may be provided with rollers, and said ends are movable upon the sides $c^1$ of the carriage $c$. Means are provided for reciprocating said thread carrier supports $e$ simultaneously in a direction perpendicular to the plane of warp.

The mechanism for effecting this movement of the members $e$ may be as follows:—

The carriage $c$ has two bars $f$ connected thereto, said bars being movable on said carriage in a direction perpendicular to the plane of the warp. Each of these members $f$ is provided with two fingers $f^1$ adapted to push the adjacent member $e$ towards the warp. Each bar $f$ has end plates $f^8$ provided with pawls $f^2$ adapted to engage the lower edge of the adjacent member $e$ and thus move said member $e$ away from the warp when said bar $f$ is moved away from the warp. Each pawl $f^2$ has a tension spring associated therewith.

Two endless chains $f^3$ are located at the sides of the carriage $c$ and said chains are perpendicular with respect to the plane of the warp $b$. A finger $f^4$ is carried by each of the chains $f^3$. $f^5$ and $f^6$ are sprocket wheels over which the chains $f^3$ run. Each of the sprocket wheels $f^6$ is mounted in a sleeve which is actuated by the shaft $a^1$ by means of gears. Each said shaft $f^7$ is slidably mounted and it has a squared end fitting in said sleeve so that each said shaft $f^7$ can move together with carriage $c$. Plates $f^8$ are connected to the ends of that one of the members $f$ which is on the same side of the warp as the sprockets $f^6$, and plates $f^8$ extend under this member $f$. Each of these plates $f^8$ has an elongated opening $f^{80}$ of appropriate shape which is engaged by a finger $f^4$. The slot or opening $f^{80}$ is of sufficient depth so that a finger $f^4$ always projects therein. Hence, the movement of the chains $f^3$ at each side of the warp, causes a reciprocatory movement of the associated bar $f$ in a direction perpendicular to the plane of the warp. $f^9$ is a cable system passing over guide pulleys and interconnecting the two members $f$ in such a way as to ensure their simultaneous movements with respect to the warp $b$.

Figure 4:
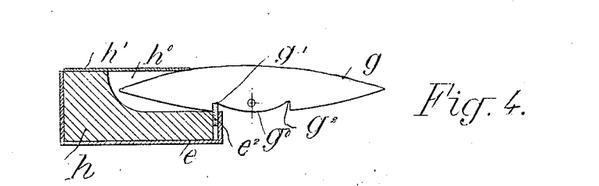
Fig. 4 shows in elevation one of the numerous tuft-shuttles $g$ inserted in a bearing member represented in section.
Figure 5:
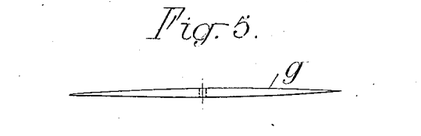
Fig. 5 shows said tuft-shuttle in plan.
Figure 6:
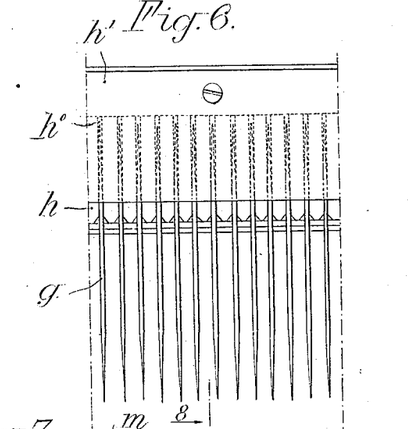
Fig. 6 shows in plan a part of the bearing member for the tuft-shuttles with thirteen pile-shuttles inserted therein.

The needles or tuft shuttles $g$ for carrying thread are constructed in the manner indicated in Figs. 4 and 5. Theye are sufficiently slender to be adapted to pass between two consecutive threads of the warp. Each shuttle 9 is provided with an intermediate hole $g^0$, or any other means for permitting the insertion of a thread. Each shuttle 9 has two notches $g^1$ and $g^2$, one on each side of the opening $g^0$.

The shuttles $g$ are mounted in grooves $h^0$ of laths or strips $h$. These laths $h$ are mounted in members $e$. The shuttles $g$ project out of said grooves $h^0$.

The distance between adjacent grooves $h^0$ may, for example, be equal to twice the distance separating the axes of two successive threads in the warp.

The grooves $h^0$ are closed on the upper face of the strip or lath $h$ by a flat iron member $h^1$ fixed to the said strip.

Automatic means are provided for connecting each strip $h$ to its member $e$ and for detaching it. This mechanism may, for example, consist of buttons $h^2$ attached to vertical faces of the strips $h$. Notches $e^0$ are provided in the longer vertical side walls of the U-shaped members $s$. These recesses or notches $e^0$ are vertical and the shanks of buttons $h^2$ project through said notches $e^0$, and are vertically movable therein. $e^1$ is a bolt consisting of a slidable flat iron member connected to the vertical wall of each member $e$, adjacent the notches $e^0$. Each bolt $e^1$ has notches $e^{10}$ having one branch parallel to the notches $e^0$ and the second branch perpendicular to that first mentioned. $c^{11}$ are ramps or cam surfaces provided on the members $c^1$ to co-operate with the ends of the bolts $e^1$ so that said bolts are pushed by the said ramps in the desired direction for releasing the laths, at the moment when the members $e$ move away from the warp $b$ and in the opposite direction at the moment when the said members again move towards the said warp. When the vertical branches of grooves or notches $e^{10}$ coincide with grooves $e^0$, then members $e^1$ are in the "release" or unbolting position.

Means are provided for automatically locking the needles $g$ to the strips $h$ of the members $e$ and for unlocking them. The arrangement may advantageously be as follows.

A slidable bolt $e^2$ consisting of a flat iron member is attached to the shorter vertical wall of each of the members $e$. Each shuttle bolt $e^2$ has provided inclined slots $e^{20}$, the said slots in one of the members being inclined in one direction, and those in the other being inclined in the opposite direction. The said shorter wall is provided with projecting studs $e^3$ equal in number to the number of the said slots and engaging in the said slots so that the longitudinal movement of the bolt $e^2$ in one direction or in the other causes it to be raised or lowered so that the said bolt engages or releases the corresponding notches $g^1$ or $g^2$ of the shuttles $g$, thus locking them or releasing them.

Control means are provided for causing the shuttles $g$ to be unlocked from one of the members $h$, and to be locked to the other member $h$, when said members are in the position of substantially greatest proximity. This control mechanism is provided on each side of the carrier $c$ and may be constructed as follows. Two pairs of pushing elements $i^1$ and $i^2$ are provided on opposite sides of the plane of the warp $b$ and each said element $i^1$ and $i^2$ is adjacent and is adapted to push the end of a bolt $e^2$ when the members $e$ are in the position of greatest proximity. $j$ is a cam on a shaft operated by suitable gears operated by the shaft $f^7$. The cam $j$ operates the previously mentioned pushing elements $i^1$ and $i^2$. Springs (not shown in the drawings) are provided for constantly bringing the said pushing elements into contact with the cam. The construction is such that each time the members $h$ are in the position of substantially greatest proximity adjacent the warp $b$, the shuttles $g$ carried in the grooves of the strip $h$ of one of the members $e$ are pushed intermediate the threads of the said warp into the grooves $h^0$ of the strip $h$ of the other member $e$. At this moment the action of the elements $i^1$ and $i^2$ on the bolts $e^2$ causes one of the elements to be moved to the locking position and the other to be moved to the release position, the locking of the said shuttles $g$ to the member $h$ to which they are transferred being commenced before they are disengaged from the other member $h$. This result is obtained by forming the flat iron member $e^2$, the notches $g^1$ and $g^2$ and the slots $e^{20}$ with suitable relative dimensions.

Automatic means are provided for the amplitude of the movement of members $e$, after each movement thereof, as a function of the length of the thread which is to be passed between and around the warp threads. This control mechanism may be constructed in the following manner. A stop bar $k$ is provided on each side of the warp $b$. Each bar $k$ is parallel to the members $e$ and $f$ and is so arranged that it stops the movement of the respective member $e$ when the latter contacts with it while moving away from the warp $b$, while allowing the member $f$ to pass beneath it. Each bar $k$ is associated with a cam surface or ramp $f^{21}$ adapted to tilt the respective finger $f^2$, in order to disengage the members $e$ and $f$ from each other. A rod $k^1$ having an external threading of high pitch is provided at each end of the member $k$. A nut $k^2$ is mounted on each screw threaded rod $k^1$, and said nut $k^2$ is attached to the respective stop rail $k$. A pawl $k^3$ is mounted on the plate $f$ of each member $f^8$.

A ratchet wheel $k^4$ is adapted to operate the screw threaded rod $k^1$ by means of bevel pinions $k^5$ and $k^6$. Hence, at each stroke of the members $f$ the pawl $k^3$ causes the ratchet wheel $k^4$ to turn through a certain angle, thus causing the movement of the nut $k^2$ and consequently of the stop bar $k$. A rapid means is provided for bringing back the stop rail very quickly when it has reached the end of its movement towards the warp. This mechanism may include an operating rod $l$ parallel to the sides $c^1$ of the carriage $c$ and provided at each end with a stop $l^1$ in the path of the nut $k^2$. $l^2$ is a pinion mounted on each screw threaded rod $k^1$. $l^3$ is a slidable pinion mounted to turn with an intermediate shaft driven from the shaft $f^7$ by means of bevel pinions $l^4$ and $l^5$. This pinion $l^3$ is adapted to be brought into engagement with the pinion $l^2$ by the operating rod $l$. $l^6$ is an oscillating arm mounted on the carriage $c$, and $l^7$ is a finger connected to the rod $l$ and having a projection engaging in a fork of $l^6$. $l^8$ is a tension spring attached at one end to the said fork and at the other end to a point on carriage $c$ laterally located with respect to the axis of oscillation of the arm $l^6$.

When the nut $k^2$ reaches the end of its movement towards the warp $b$ it contacts with that one of the stops $l^1$ which is adjacent said warp and it moves the rod $l$ in a direction towards the warp, thus gradually meshing the pinion $l^3$ with the pinion $l^2$. At the moment when the point of attachment of the spring $l^8$ to the fork of the arm $l^6$ passes over the straight line between the axis of oscillation of the said arm and the fixed point of the spring, the spring actuates arm $l^6$ in the same direction, and this causes the meshing of the pinion $l^3$ with the pinion $l^2$. The screw threaded rod is then moved with great velocity and this brings back the nut $k^2$ until it comes against the second stop $l^1$ which alone is visible in Fig. 3. This together with the action of spring $l^8$ causes the disengagement of the pinions $l^2$ and $l^3$, so that they are moved to the position shown in Fig. 3.

Figure 3:
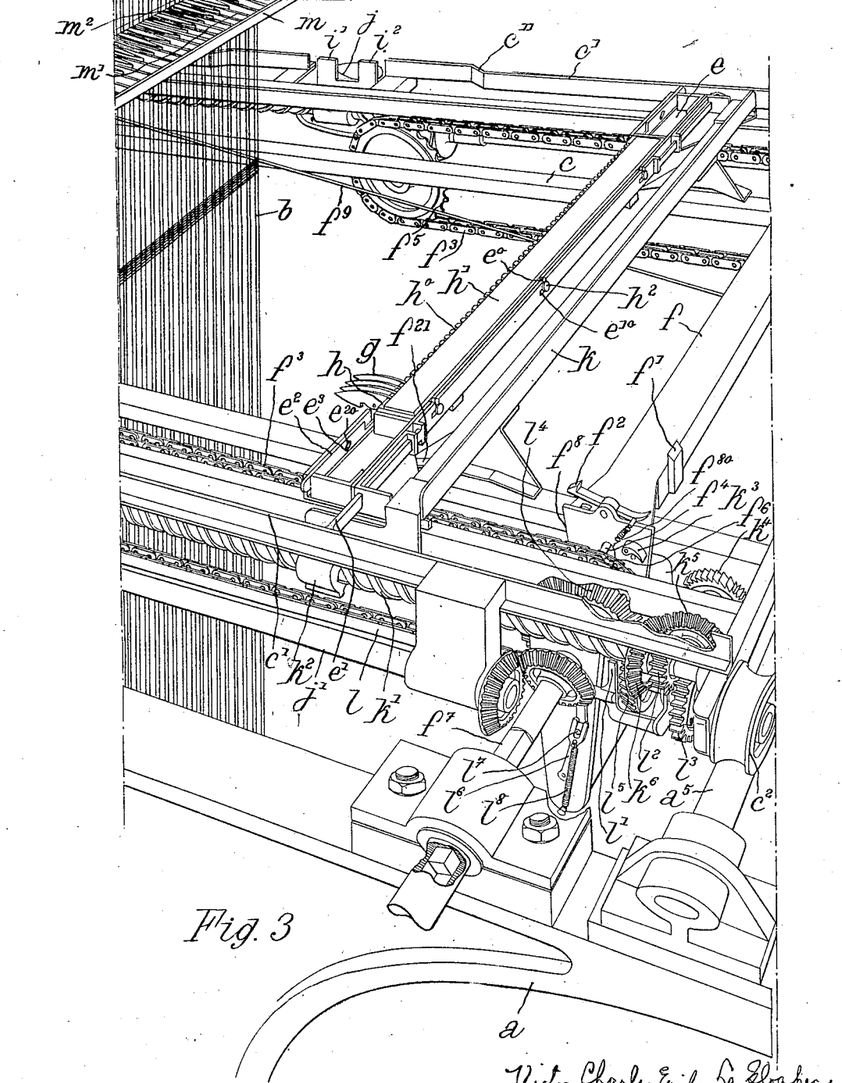
Fig. 3 shows in perspective a portion of the loom illustrated at Figs. 1 and 2.
Figures 7, 8:
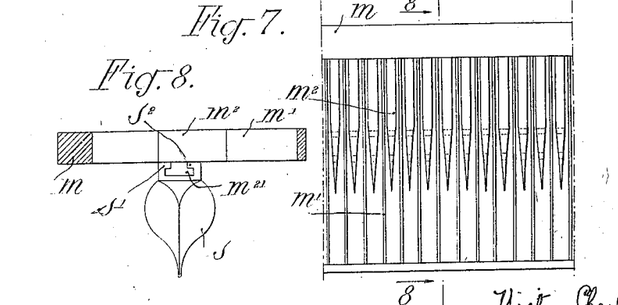
Fig. 7 shows in plan a part of a horizontal comb for hammering down the weft and Fig. 8 shows the same comb in transversal section.
Figure 9:
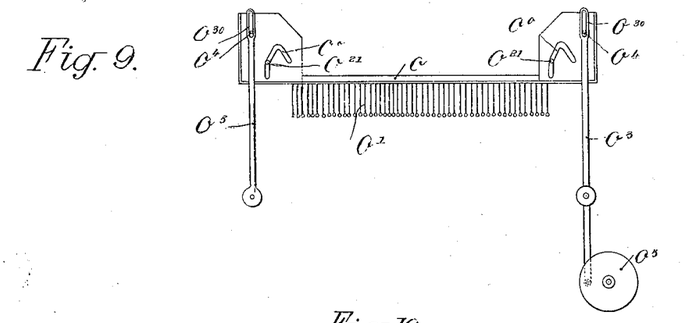
Fig. 9 shows in elevation a half heald for the slight lateral displacement of a part of the warp threads.

$m$ is a comb, shown in Figs. 3, 7 and 8, so constructed that it has long teeth $m^1$ and short teeth $m^2$ alternating with one another. The shorter teeth are preferably thicker than the longer teeth, and the distance between the axes of the teeth of the same kind is twice the distance between the axes of two consecutive threads in the warp. Each short thick tooth $m^2$ has a projecting member $m^{21}$ of inverted T-shape, on the side or face at the lower surface of the comb.

Operating means are provided so that ordinarily the warp threads pass by pairs substantially between the thin teeth, the thicker teeth remaining almost behind the warp plane. However, as soon as the comb must press down on the fabric a row of tuft knots which have been just completed, the comb must move forward so that the thick teeth pass positively between the warp threads, so that all the teeth then operate to press down the rows of knots. This movement may be secured as follows:

$n$ are two movable standards adapted to support the comb $m$ in the horizontal position. $n^1$ are two grooves provided in a part of the frame $a$. These grooves are adapted to serve as guides for two fingers or rollers carried by the standards $n$. $n^3$ are two oscillating levers pivotally connected at their ends to the standards $n$. The other ends of said levers $n^3$, which are pivotally connected to the frame $a$ intermediate their ends, each have a roller engaging in a groove cam $n^4$ mounted on a shaft which is operated by suitable gears from the shaft $a^1$.

A half heald is provided similar to that found in certain kinds of looms for weaving. By means of this, the odd numbered threads, for example, may be pulled out of the plane of the warp, so as to facilitate the passage of the tuft-shuttles $g$. This half heald may include a member $o$ carrying threads of cotton, or metal wires $o^1$ equal in number to half the threads of the warp $b$, and each terminating in a loop or eye, through which the alternate threads of the warp pass. This half heald thus enables the displacement of half of the threads of the warp at the desired moment. This construction may include a pair of horizontal brackets, $o^2$ supporting the member $o$ and carrying two fingers $o^{21}$. $o^0$ are two grooves forming cam ways of appropriate shape provided in the fixed guide plates connected to the heald member $o$. The fingers $o^{21}$ of the brackets $o^2$ enter said grooves. $o^3$ are two oscillating levers fulcrumed to frame $a$. One extremity of each lever $o^3$ is provided with an elongated slot $o^{30}$, in which a finger $o^4$ carries one of the said guide plates. $o^5$ is a grooved cam operated from the shaft $a^1$ by means of suitable intermediate means, and it operates the adjacent lever $o^3$. In certain cases it is necessary to shoot transverse wefts above a row of knots after such row of knotted tufts has been finished. This is necessary in weaving tufted fabrics of the oriental type, in which it is necessary to bind the rows of tufts or knots by wefts. The mechanism for this is as follows:—

Figure 10:
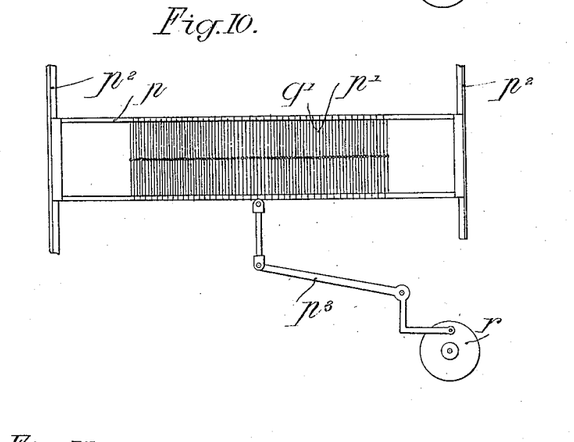
Fig. 10 shows in elevation a part of ordinary healds (called also heddle frames) to open the shed of the warp threads in order to throw a weft.

Healds $p$ and $q$ are provided corresponding to the even threads of the warp and the odd threads respectively. Each of these is constructed as shown in Fig. 10, with a rectangular frame in which are metallic wires which are transversely stretched. The heald $p$ has wires $p'$ and the heald $q$ has wires $q'$. Each wire $p'$ and $q'$ carries an eyelet or loop embracing a thread of the warp, and these healds enable the adjacent threads of the warp to be simultaneously bent in opposite directions. The operating means for this purpose are as follows:—

$p^2$ and $q^2$ are guides in which the edges of the healds $p$ and $c$ are adapted to slide. The guides $p^2$ and $q^2$ have guides grooves which are perpendicular to the plane of the warp. $p^3$ and $q^3$ are lever means operated by a cam $r$ of appropriate shape which is operated by the shaft $a^1$ through suitable transmission mechanism. $s$ is a shuttle for causing the passage of the weft thread through the threads of the warp, as shown in Fig. 8. Its top is provided with two flanges $s^1$ and $s^2$, which enables the shuttle to be suspended under the comb $m$ by means of the projecting members $m^{21}$, so that the shuttle can slide from one side to the other of the comb. Means are provided for throwing the shuttle $s$, and such means may be located at each side of the machine as follows:—$s^3$ designates two pushing members, each being adapted to slide on the edge of the comb $m$. $m^3$ designates two stops carried by the upper surface of the comb at a certain distance from its end and adapted to stop the pushing member. $s^4$ designates two oscillating levers, the upper ends of which being adjacent a pushing member $s^3$, each lever $s^4$ is guided in its movements by a guide $s^5$ when the comb is lowered. $s^6$ designates two step cams operated by the shaft $a^1$ by means of appropriate transmission mechanism. $s^7$ designates two return springs. The operation is as follows:—The cam $s^6$ moves the upper end of the respective lever $s^4$ gradually away from the pushing member $s^3$, so that at the moment when the shuttle $e$ is to be thrown the step of the cam $s^6$ comes opposite the lever $s^4$, the result being that the lever is left free to be acted upon by the spring $s^7$, thus bringing back the upper end of the lever $s^4$ quickly against the pushing element $s^3$, thus projecting the shuttle to the other side of the comb.

In the foregoing manner, and by properly selecting the shapes of the various cams, ramps, grooves, etc., and by a proper relation between the various gear ratios a machine is obtained which enables a small or large detail to be mechanically inserted at any point during the weaving of carpets and tapestry, including any design and of any shade.

Figure 11:
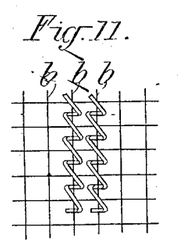
Figs. 11, 12 and 13 show details of the weaving of tapestry and carpets usually executed by hand and adapted to be executed mechanically by means of the said loom.

For instance, in weaving a kind of tapestry known as "petit point" (little knot) which does not require the cutting of the turf yarn, a species of weave shown diagrammatically in Fig. 11 may be used. The member $e$ has placed therein a strip $h$ provided with tuft shuttles carrying threads of wool or silk of appropriate color according to the design which it is desired to produce. The introduction of the strip $h$ into the corresponding or front member $l$ locks the needles. The member $e$ approaches the warp $b$, the result being to lock the strip $h$ in the member $e$. The members $g$ pass between the threads of the warp, adjacent each odd thread, opposite a wide tooth in the comb $m$. Each member $g$ enters a groove of the empty strip $h$ which is carried by the rear member $e$. The pushing elements $i^1$ and $i^2$ operate to unlock the members $g$ of the front member $e$ and lock them in the second member $e$. The members $e$ then move away from one another. The carriage $c$ is displaced towards the right to a distance equal to the space between the axes of two consecutive threads of the warp. The members then move towards each other. The members $g$ pass through adjacent the even threads of the wrap and are reengaged with strip $h$ of the front member $e$. The carriage $c$ then moves back to its original position. The comb $m$ is lowered. The healds $p$ and $q$ operate to bend or cross the wrap threads and the shuttle $s$ is thrown across the warp to pass the weft. The comb is then lowered to press the knot into position. The formation of one row of the weave is thus finished. At each movement of each of the members $e$ the regulating stop rail $k$ has been displaced towards the warp $b$ for a distance equal to the length of the wool corresponding to one movement of a member $g$, so as to ensure even tension in the threads or the needles. The roller $a^3$ then turns through a very small distance corresponding to the height of one row of the weave. In some cases the whole strip $h$ may be changed. In other cases only certain of the members $g$ according to the design to be produced are changed, and then the machine is ready to weave a new row.

As has been previously stated, the invention is not limited to the method of application or to the constructional embodiment more particularly described.

Figure 12:
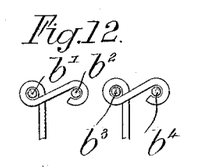

For example, another kind of tapestry knot or stitch may be formed as shown diagrammatically in Fig. 12 by appropriately combining cams and transmission mechanism and utilizing the half heald $o$. In this case the members $g$ pass forwardly through the warp at the right of each odd thread $b^1$. The carriage $c$ is then moved to the left for a distance equal to the distance between adjacent warp threads and the members $g$ are then replaced in the front strip $h$, so that they come back at the left of the odd threads $b^1$ or $b^3$. The carriage $c$ is then moved to the right for a distance corresponding to the spacing of the warp threads. The members $g$ now move forwardly at the right hand sides of odd warp threads $b^1$ and $b^3$. The half heald $c$ is utilized to draw the even threads $b^2$ and $b^4$ forward and to the left to make sure that the knots will be formed as described. The long comb teeth $m^1$ prevent the even warp threads $b^2$ and $b^4$ from being moved too far to the left. As soon as the members $g$ have again moved to the front of the warp, the movement of half heald $o$ permits the even warp threads to move to their original position. The comb $m$ now descends to press down the newly formed rows of knots. This operation is then repeated. In order to unite warp threads which have not been united by the movement of members $g$, when a certain number (as three) of rows of knots have been formed, the carriage $c$ is then moved a distance corresponding to the spacing of four warp threads, for example, so that the tuft thread unites all the warp threads.

Figure 13:
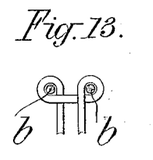
Figure 14:
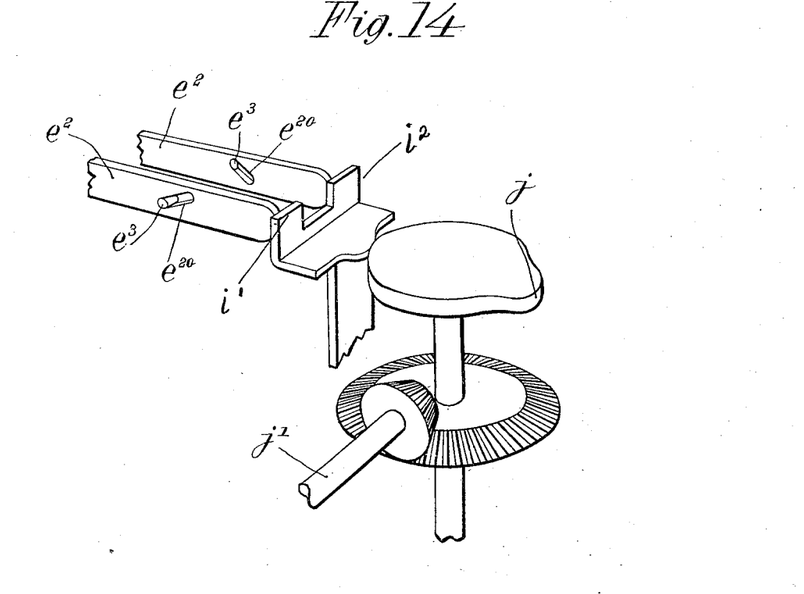
Fig. 14 is a detailed perspective view showing part of the mechanism for transferring the rows of shuttles.
Figure 15:
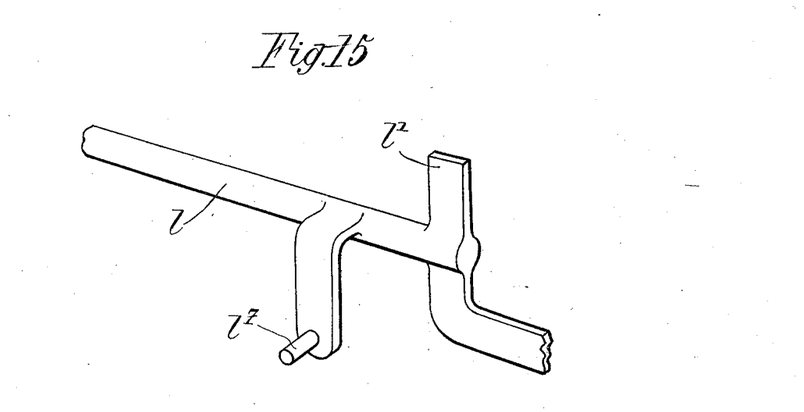
Fig. 15 is a detailed view of part of the shuttle operating mechanism.

The particular form of cutting device to be used in connection with the weaving of fabrics of the type illustrated in Figs. 12 and 13 is of little consequence and forms no part of the present invention. The special weaves shown in these figures are merely illustrative of various types of knots which may be woven by the hereinbefore described machine.

According to another modification tapestry would be produced with small knots or stitches on canvas. The foundation material or canvas would be woven as the rows of knots were formed, two weft threads being thrown after each row of knots had been formed. Such tapestry would comprise "single" knots and "quadruple" knots.

According to another modification a machine such as that previously described might be combined with a mechanical jacquard, which would enable a material of any kind whatever to be formed mechanically from silk or otherwise and comprising tapestry patterns.

Having now particularly described and ascertained the nature of my said invention and in what manner the same is to be performed, I declare that what I claim is:—

1. A loom including means adapted to support the warp threads, a movable carriage adapted to be moved in a direction having a component parallel to the plane of the warp threads, movable tuft-shuttle holders located on opposite sides of the warp holding means and mounted on said carriage and movable in a direction having a component perpendicular to the plane of the warp threads, means adapted to actuate said holders so that they are moved towards each other and away from each other, movable retaining mechanism associated with each of said holders and adapted to retain said tuft-shuttles therein and to release said tuft-shuttles therefrom, and control means adapted to operate the retaining mechanism in each of said holders to release the tuft-shuttles in one of said holders and to retain them in the other of said holders.

2. In a loom, the sub-combination of means adapted to hold the warp threads, movable tuft-shuttle holders located on opposite sides of said warp-holding means, and means adapted to impart movements to said holders parallel with respect to the plane of said warp, and also perpendicular with respect to the plane of said warp.

3. In a loom, the sub-combination of means adapted to hold the warp threads, movable tuft-shuttle holders located on opposite sides of said warp holding means, means adapted to move said holders in a direction having a component parallel to the plane of the warp threads, and means adapted to actuate said holders in a direction having a component perpendicular to the plane of the warp threads, said holders being always substantially equally spaced from the plane of the warp threads.

4. In a loom, the sub-combination of means adapted to hold the warp threads, movable tuft-shuttle holders located on opposite sides of said warp holding means, means adapted to actuate both said holders in a direction having a component parallel to the plane of the warp threads, means adapted to actuate one of said holders in a direction having a component perpendicular to the plane of said warp threads, and connecting means intermediate said holders and adapted to cause their simultaneous to and fro movement through a series of positions in which they remain substantially equally spaced with respect to the plane of the warp threads.

5. In a loom, the sub-combination of means adapted to hold the warp threads, and a comb having alternate long thin teeth and short thick teeth, and guide means associated with said comb and adapted to guide the movement of a weft shuttle.

6. In a loom, the sub-combination of means adapted to hold the warp threads, and a comb having alternate long thin teeth and short thick teeth, and guide means associated with said comb and adapted to guide the movement of a weft shuttle, and means adapted to move said comb in a direction having a component parallel to the warp threads and a component perpendicular to the warp threads.

7. In a loom, the sub-combination of means adapted to hold the warp threads, and a comb having alternate long thin teeth and short thick teeth, and guide means associated with said comb and adapted to guide the movement of a weft shuttle, the said long thin teeth being sufficiently spaced to permit a pair of warp threads to pass between them.

8. In a loom, the sub-combination of means adapted to hold the warp threads, movable tuft-shuttle holders located on opposite sides of said warp-holding means, and means adapted to reciprocate said holders towards and away from the plane of the warp threads in a series of strokes of decreasing length.

9. In a loom, the sub-combination of means adapted to hold the warp threads, movable connected tuft-shuttle holders located on opposite sides of said warp holding means, holder actuator means adapted to engage said holders and to impart reciprocating movements to said holders towards and away from the plane of the warp threads, adjustable release mechanism adapted to release said holders from their actuating means during the outward stroke of said actuating means, and control mechanism adapted to move said release mechanism towards the plane of the warp threads step by step for each reciprocation of said holders.

10. In a loom, the sub-combination of means adapted to hold the warp threads, movable tuft-shuttle holders located on opposite sides of said warp holding means, holder actuator means adapted to engage said holders and to impart reciprocating movements to said holders towards and away from the plane of the warp threads, adjustable release mechanism adapted to release said holders from their actuating means during the outward stroke of said actuating means, and control mechanism adapted to move said release mechanism towards the plane of the warp threads step by step for each reciprocation of said holders, and return mechanism adapted to move said release mechanism away from the plane of the warp threads to a predetermined position, after said release mechanism has reached a definite position adjacent said warp threads.

11. In a loom, the combination of means adapted to support the warp threads, the movable carriage $c$ adapted to be moved to and fro in a direction substantially parallel to the plane of the warp threads, a shaft $d$, a plurality of cams $d'$ slidably mounted on the shaft $d$, means adapted to cooperate with one of said cams $d'$ when it is located in a definite position on said shaft $d$ to reciprocate the carriage $c$, and selector means adapted to shift any of said cams $d'$ into operative position with said carriage actuating means, tuft-shuttle holders $e$ movably mounted on the said carriage on opposite sides of the plane of the warp and adapted to be moved in a direction perpendicular to the plane of the warp, and means adapted to simultaneously actuate the tuft-shuttle holders $e$.

12. In a loom, the combination of means adapted to hold the warp threads, a movable carriage $c$ adapted to be moved to and fro in a direction substantially parallel to the plane of the warp, carriage actuating cam means adapted to actuate said carriage, tuft-shuttle holders $e$ movably mounted on the said carriage on opposite sides of the plane of the warp and adapted to be moved in a direction substantially perpendicular to the plane of the warp, connecting means intermediate said tuft-shuttle holders $e$ and adapted to secure their simultaneous movement in opposite directions, a bar $f$ movably mounted upon the carriage $c$ and adapted to be moved in a direction substantially perpendicular to the plane of the warp, engaging means on the bar $f$ adapted to engage the adjacent tuft-shuttle holders $e$, an endless chain having a finger engaging a vertically slotted projection of said bar $f$ and means adapted to actuate the said endless chain so that it operates to reciprocate the said bar $f$.

13. A device according to claim 12 in which the said endless chain is mounted on sprockets and one of said sprockets has a shaft revoluble with and slidable with respect to a sleeve mounted on the frame of the loom, and means adapted to revolve the said sleeve.

14. In a loom, the combination of means adapted to support the warp threads, tuft-shuttle holders $e$ movably mounted upon opposite sides of the plane of the warp threads, means adapted to cause said tuft-shuttle holders $e$ to be moved simultaneously and in opposite directions along a line substantially perpendicular to the plane of the warp, each said tuft-shuttle holder $e$ having a lath $h$ provided with a series of grooves $h^o$ in which the tuft-shuttles are respectively mounted, releasable locking means adapted to lock the said laths $h$ to their respective tuft-shuttle holders $e$ and to release the said laths $h$ from their respective tuft-shuttle holders $e$, and cam means adapted to operate the said releasable locking means so as to move them to the released position in one position of the said tuft-shuttle holders $e$ and to lock the said locking means in another position of each said tuft-shuttle holder $e$.

15. In a loom, the combination of means adapted to hold the warp threads, tuft-shuttle holders $e$ located on opposite sides of the plane of the warp threads, tuft-shuttles $g$ adapted to be held in the said tuft-shuttle holders $e$, means adapted to move the said tuft-shuttle holders $e$ simultaneously and in opposite directions so that the said tuft-shuttle holders $e$ assume a position in which a tuft-shuttle $g$ located in one of said holders $e$ also projects into the other holder $e$, locking bars $e^2$ associated with the said tuft-shuttle holders $e$ and movable towards and away from the said tuft-shuttles $g$ and cam means adapted to actuate the locking bars $e^2$ when the tuft-shuttle holders $e$ are in the above mentioned position, so that the said tuft-shuttles $g$ are unlocked from one of said holders $e$ and they are locked to the other said holder.

16. In a loom, the combination of means adapted to hold the warp threads, tuft-shuttle holders $e$ located on opposite sides of the plane of the warp threads and movable along a line substantially perpendicular to the plane of the warp threads, connections intermediate the tuft-shuttle holders $e$ whereby they are caused to be simultaneously moved in opposite directions, an actuating bar $f$, means adapted to reciprocate the bar $f$ in a direction substantially perpendicular to the plane of the warp threads, a movable stop rail $k$ located above the path of movement of the bar $f$ so that the bar $f$ can pass below the stop rail $k$, the bar $f$ having a finger $f'$ adapted to push the adjacent tuft-shuttle holders $e$ towards the plane of the warp, the bar $f$ also having a pivoted spring actuated pawl $f^2$ adapted to move the adjacent tuft-shuttle holders $e$ away from the plane of the warp, cam means associated with the said stop rail $k$ and adapted to release the pawl $f^2$ from said tuft-shuttle holders $e$ and stop rail actuating means adapted to be intermittently actuated by each stroke of the bar $f$ away from the plane of the warp to move the stop rail step by step towards the plane of said warp.

17. A device according to claim 16 including means adapted to engage said stop rail $k$ when it has moved to a predetermined position adjacent the warp and to continuously move it away from the warp to a second predetermined position.

18. A device according to claim 16 including the threaded rod $k'$ adapted to co-operate with a nut $k^2$ connected to the stop rail $k$, the said rod $k'$ having a pinion $l^2$ connected thereto, a revoluble pinion $l^3$ adapted to mesh with the pinion $l^2$ and a slidable control rod $l$ having stops $l'$ adapted to be engaged by the nut $k^2$ whereby the movement of the nut $k^2$ causes the sliding movement of the rod $l$ and the engagement of the pinions $l^2$ and $l^3$, the revolution of the pinion $l^3$ being adapted to actuate the nut $k^2$ away from the plane of the warp.

19. A device according to claim 16 including the threaded rod $k'$ adapted to co-operate with a nut $k^2$ connected to the stop rail $k$, the said rod $k'$ having a pinion $l^2$ connected thereto, a revoluble pinion $l^3$ adapted to mesh with the pinion $l^2$ and a slidable control rod $l$ having stops $l'$ adapted to be engaged by the nut $k^2$ whereby the movement of the nut $k^2$ causes the sliding movement of the rod $l$ and the engagement of the pinions $l^2$ and $l^3$, the revolution of the pinion $l^3$ being adapted to actuate the nut $k^2$ away from the plane of the warp, a lever $l^6$ pivoted to the frame of the loom and adapted to co-operate with a finger $l^7$ on the rod $l'$, and a tension spring $l^8$ having one end connected to the top portion of the lever $l^6$, the other end of the spring $l^8$ being connected to the frame of the loom at a point laterally spaced from the pivotal connection of the lever $l^6$ to the frame of the loom.

In testimony whereof I have hereunto set my hand.

VICTOR CHARLES EMILE LE GLOAHEC.